US008442218B2

(12) United States Patent
Schneider

(10) Patent No.: US 8,442,218 B2
(45) Date of Patent: May 14, 2013

(54) METHOD AND APPARATUS FOR COMPOUND HASHING VIA ITERATION

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 708 days.

(21) Appl. No.: 12/395,104

(22) Filed: Feb. 27, 2009

(65) Prior Publication Data

US 2010/0220853 A1    Sep. 2, 2010

(51) Int. Cl.
*H04L 29/06* (2006.01)

(52) U.S. Cl.
USPC .................. 380/29; 380/28; 380/38

(58) Field of Classification Search .......... 380/29, 380/28, 38
See application file for complete search history.

(56) References Cited

U.S. PATENT DOCUMENTS

| | | | | |
|---|---|---|---|---|
| 5,623,545 | A * | 4/1997 | Childs et al. ................ | 380/2 |
| 6,526,509 | B1 * | 2/2003 | Horn et al. ................ | 713/171 |
| 6,578,144 | B1 * | 6/2003 | Gennaro et al. ............ | 713/176 |
| 7,949,630 | B1 * | 5/2011 | Auchmoody ............... | 707/609 |
| 2002/0066014 | A1 * | 5/2002 | Dworkin et al. ............ | 713/168 |
| 2002/0122554 | A1 * | 9/2002 | Lilly .......................... | 380/28 |
| 2004/0193875 | A1 * | 9/2004 | Aura .......................... | 713/162 |
| 2005/0005098 | A1 * | 1/2005 | Michaelis et al. .......... | 713/156 |
| 2006/0291650 | A1 * | 12/2006 | Ananth ...................... | 380/46 |
| 2007/0106908 | A1 * | 5/2007 | Miyazaki et al. ........... | 713/189 |
| 2007/0157028 | A1 * | 7/2007 | Lott ........................... | 713/182 |
| 2007/0277043 | A1 * | 11/2007 | Sorensen .................... | 713/180 |
| 2007/0283158 | A1 * | 12/2007 | Danseglio .................. | 713/180 |
| 2010/0115230 | A1 * | 5/2010 | Ciet et al. .................. | 711/216 |

OTHER PUBLICATIONS

Ioannis I. et al, Maximizing the hash function of authentication code, 2006.*
Hmac fips pub 198, The Keyed-Hash Message Authentication Code (HMAC), Mar. 2002.*
Michail et al, Efficient Implementation of the Keyed-Hash Message Authentication Code (HMAC), 2004.*
Kim et al, Efficient Implementation of the Keyed-Hash Message Authentication Code Based on SHA-1 Algorithm for Mobile Trusted Computing, 2007.*

* cited by examiner

*Primary Examiner* — Andy Rao
*Assistant Examiner* — Shan Elahi
(74) *Attorney, Agent, or Firm* — Lowenstein Sandler LLP

(57) ABSTRACT

A method and apparatus for a system and process for generating a hashing value using any number of cryptographic hashing functions. The hashing process receives an input value to be hashed. The input value is cyptographically hashed and augmented. The augmented value is then cryptographically hashed. The process then iteratively applies a set of non-linear functions to these values. Each iteration maintaining a 'left half' and 'right half.' After the last iteration, the left and right portions are concatenated to form a hash value that is output.

20 Claims, 5 Drawing Sheets

METHOD AND APPARATUS FOR COMPOUND HASHING VIA ITERATION

TECHNICAL FIELD

Embodiments of the present invention relate to hashing of data values. Specifically, the embodiments of the invention relate to a method and apparatus for iteratively generating a compound hash value.

BACKGROUND

Cryptographic hash functions are utilized in connection with many types of applications. Cryptographic hash functions are utilized for message authenticity or integrity checks, digital signatures, password authentication, cryptographically secure communication protocols, and similar applications. Cryptographic hash functions can also be utilized to detect data file modifications or duplications. In some cases, the cryptographic hash functions are utilized to detect data loss via checksums or similar functions. Cryptographic hash functions are distinct from general hash algorithms that are utilized to generate indices for mapping data into a table.

Cryptographic hash functions are deterministic functions that can operate on any size of input data and return a fixed-size hash value. The probability that any two sets of input data would have the same hash value is so low that the hash values can be relied upon as identifiers for the original data set for purposes of verification, authentication, error detection, data loss and similar functions. Cryptographic hash functions are extremely difficult to reverse (i.e., construct an original data set from a hash value. Due to the low probability of obtaining identical hash values for different data sets, it is also very difficult to modify a data set without changing its hash value. Cryptographic hash value computations are generally not computationally intense, allowing them to be utilized in encrypted communication protocols and similar contexts where a large amount of data must be processed or transmitted quickly.

Commonly utilized cryptographic hash functions include MD5, SHA-1, and HMAC. Periodically, mathematical weaknesses are found in cryptographic hashing functions. This exposes data that was in any way protected by the weak cryptographic hashing functions, sometimes many years after the hashing function was utilized. The newest hashing functions such as SHA-512 are more secure and produce large hash values (i.e., 512 bits), but require 64-bit integer operations, which are more computationally intensive and not supported by many platforms such as embedded platforms.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Described herein is a method and apparatus for a system and process for iteratively generating a compound hashing value using any number of cryptographic hashing functions. The hashing process receives an input value to be hashed. The input value is cyptographically hashed and augmented. The augmented value is then cryptographically hashed. The process then iteratively applies a set of non-linear functions to these values. Each iteration or 'round' maintaining a 'left' and 'right' portion. After the last iteration, the left and right portions are concatenated to form a final hash value that is output.

Figure 1:
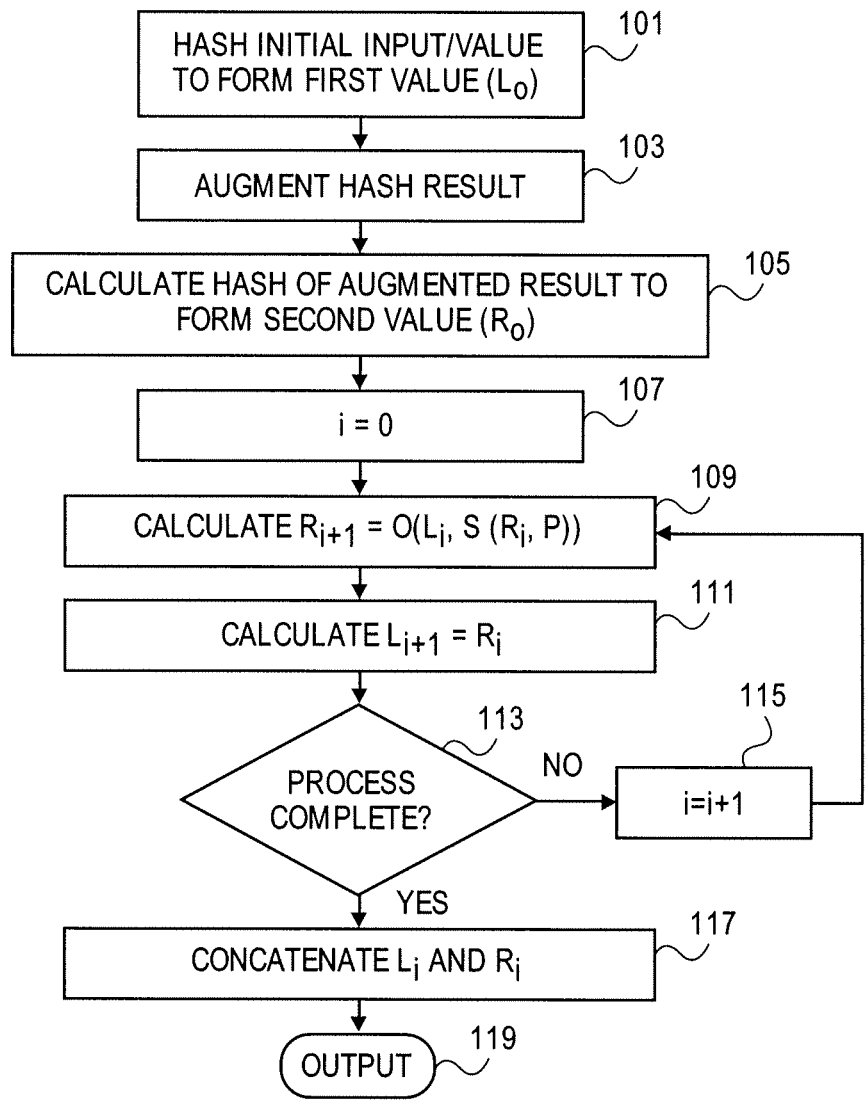
FIG. 1 is a flowchart of one embodiment of a method for iteratively generating a non-fixed length compound hash value.

FIG. 1 is a flowchart of one embodiment of a method for iteratively generating a non-fixed length compound hash value. The process is initiated by receiving an input value or a call with an input parameter. The input value can have any size and include any type of data. The input value can be received from any application, program, module, hardware device or other source. The input value is then processed with a cryptographic hashing function to generate a first value ($L_0$) (block 101). All the hashing functions described herein unless otherwise specified are cryptographic hashing algorithms. Any cryptographic hashing function can be utilize to process the input value including MD5, SHA, message authentication codes (MACs), keyed-hash MAC (HMAC) and similar hashing functions or functions that incorporate hashing functions. The selection of the cryptographic hashing function can be determined by a programmer or user. The selection can also be automatically made based on required output sizes or similar criteria.

The first value ($L_0$) can serve as a first portion or 'left half' in a pair of values that are used in series of hashing functions that have a structure analogous to a Feistel Network. The second value ($R_0$) or second portion or 'second half' is then generated by first augmenting the input value by concatenating the first value ($L_0$) to the input value (block 103). The augmentation is optional and can be varied. In other embodiments, the augmentation concatenates the first value ($L_0$) to the beginning of the input value, end of the input value or both. In further embodiments, any combination of the input value and the first value ($L_0$) can be made.

The augmented value is then hashed using a cryptographic hashing function to generate the second value ($R_0$) (block 105). Any cryptographic hashing function can be utilized to process the input value including MD5, SHA, MACs, HMACs and similar hashing functions or functions that incorporate hashing functions. The selection of the cryptographic hashing function can be determined by a programmer or user. The selection can also be automatically made based on required output sizes or similar criteria. In one embodiment, this cryptographic hashing function is identical to the cryptographic hashing function utilized to generate the first value ($L_0$). In another embodiment, a different cryptographic hashing function is utilized. Use of multiple different cryptographic hashing functions protects the results in the case that any of the cryptographic hashing functions that are utilized are subsequently found to be mathematically weak or otherwise flawed.

The calculation of the first value ($L_0$) and the second value ($R_0$) can be represented in a set of equations:

$$L_0 = H(P)$$ Equation 1

$$R_0 = H(L_0, P, L_0) \quad \text{Equation 2}$$

where L and R are the left and right halves (i.e., the first and second values), H( ) is a cryptographic hashing function and P is the input value. $L_0$ could also be combined with fixed data before use in Equation 2. For example, $L_0$ could be XOR'ed with a bit string of equivalent length.

Once the first value ($L_0$) and second value ($R_0$) (or the left and right halves) have been calculated then the iterative calculation of the final hash value can be initiated. The iterative process can be considered a series of rounds, steps or iterations. These rounds can be represented by a label (i), where the first round is round 0 (block 107). When represented in equational form variables are represented with a subscript i that indicates the matching round for the value of that variable. The iterative calculation process is modeled on a Feistal Network structure using the following equations:

$$R_{i+1} = O(L_i, S(R_i, P)) \quad \text{Equation 3}$$

$$L_{i+1} = R_i \quad \text{Equation 4}$$

where L and R are the left and right halves, O can be a linear or non-linear function, S is a non-linear function, and P is the input value. If O is linear, then S should be a strongly non-linear function such as a cryptographic hash function (e.g., MD5, SHA, MAC or HMAC).

The first step in calculating $R_{i+1}$ (block 109) is to calculate $S(R_i, P)$. The function S can be be any strongly non-linear function that is essentially unbiased. In one example embodiment, S is an HMAC function. In this example, the key for the HMAC is $R_i$. The key is used to hash the input value. The result of this function is then utilize as a parameter of $O(L_i, S(R_i, P))$. The function O can be any linear or non-linear function. In one example embodiment, O is a linear function such as the XOR function. In another example embodiment, the function O is an HMAC function. In this example, the key for the HMAC function O is $L_i$. The key is used to hash the input value again. The resulting hash value becomes $R_{i+1}$. Any cryptographic hashing function can be utilized to as either of the non-linear functions O or S including MD5, SHA, MACs, HMACs and similar hashing functions or functions that incorporate hashing functions. The selection of a cryptographic hashing function or other non-linear function can be determined by a programmer or user. The selection can also be automatically made based on required output sizes or similar criteria. Any combination of functions can be selected for O and S, including the use of identical functions.

The old right half value then becomes the new left half value $L_{i+1}$ for the next round (block 111). A check is made to determine whether the iterative process has completed (block 113). The iterative process can be set to any number of rounds. In one embodiment, a single round is utilized. A single round is sufficient to construct a hashing result where each bit depends on each input bit. In another embodiment, the iterative process includes at least three rounds. After three rounds each bit of the hashing result depends on each bit of the initial left half value L and right half value R. If the functions that produced the initial L and R values are different, then every bit of the hashing result depends on each bit of the input and on the hash functions used to produce L and R. This differentiates the security of the hashing result from a simple concatenation of a series of hash results using different algorithms.

If the iterative process has not completed, then the round number (i) is increased by one (block 115) and the next round is started (block 109). If the iterative process has completed, then the current left half and right half values are combined by concatenation or similar process (block 117) to form the final hash value. The combination step can be utilized to tailor the size of the output to be any size that is desired by a user or caller. The output can be returned to a calling process, stored in a known location or similarly output (block 119). In another embodiment, a recursive process can be utilized in place of the iterative process or the iterative process can be utilized within a recursive process to generate hashing values of any desired length.

Figure 2:
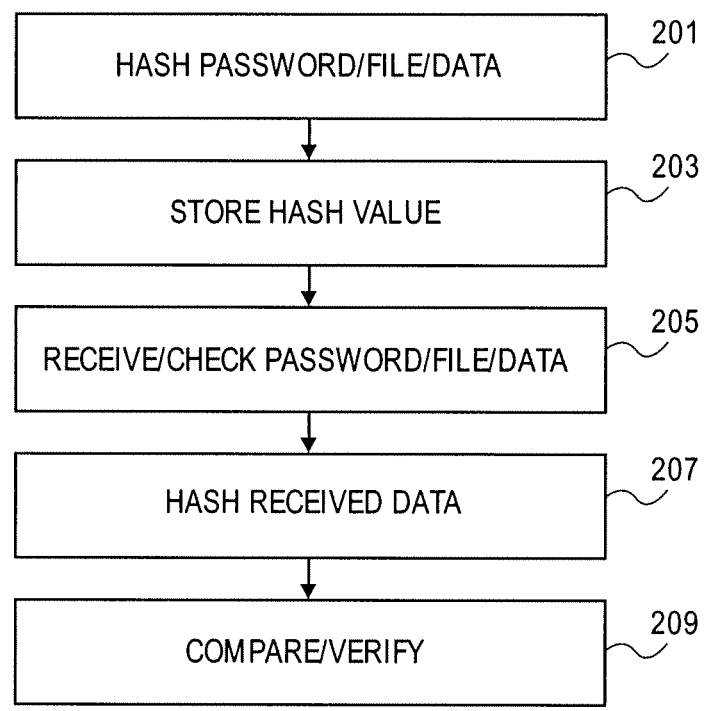
FIG. 2 is a flowchart of one embodiment of a method for utilizing an iterative compound hash value.

FIG. 2 is a flowchart of one embodiment of a method for utilizing an iterative compound hash value. In one example embodiment, the iterative compound hash function is called or utilized to hash a password, file or other data source (block 201). The call can also include other parameters including a hash value length. The type of data to be hashed can depend on the type of program that is calling the cryptographic hash function. Password authentication, file verification, secure communication protocols, error checking and similar programs can each utilize the iterative compound hash function. Once the hash value has been generated by the iterative compound hash function it can then be stored by the calling program or the hash function itself. This stored hash value can be utilized for future comparison with other hash values.

The calling program may then receive a new password, file or similar set of data that is to be verified, authenticated, error checked or similarly processed by utilizing the iterative compound hash function (block 205). Authentication and verification programs typically compare new or received passwords, files or other data with previously received passwords, files and data by comparison of hash values for each password, files or other data sets.

The received data is hashed using the same cryptographic hash functions and same settings or parameters (block 207). The result of the cryptographic hashing function is then compared to the appropriate stored hash values (block 209). Hash values that are to be compared can also be received with the data to be hashed. For example, in some secure and unsecured data communication protocols, a checksum or similar value is provided with each message. The checksum is a hash of the message prior to transmission and/or encryption. Matching checksums indicates that no data has been lost in transmission or decryption.

In other embodiments, if the hash values are identical then the verification or authentication can be granted or approved, because the likelihood of another password, file or data set generating the same hash value is extremely low. Use of hash values in this context allows for convenience of storage, because the hash values are likely to be much smaller than large data files. For passwords, hash values can be stored without exposing the actual password to theft or unauthorized access. One of ordinary skill in the art would understand that there are many other uses of the iterative compound hash function that are consistent with the processes and structures described above in relation to these example embodiments.

Figure 3:
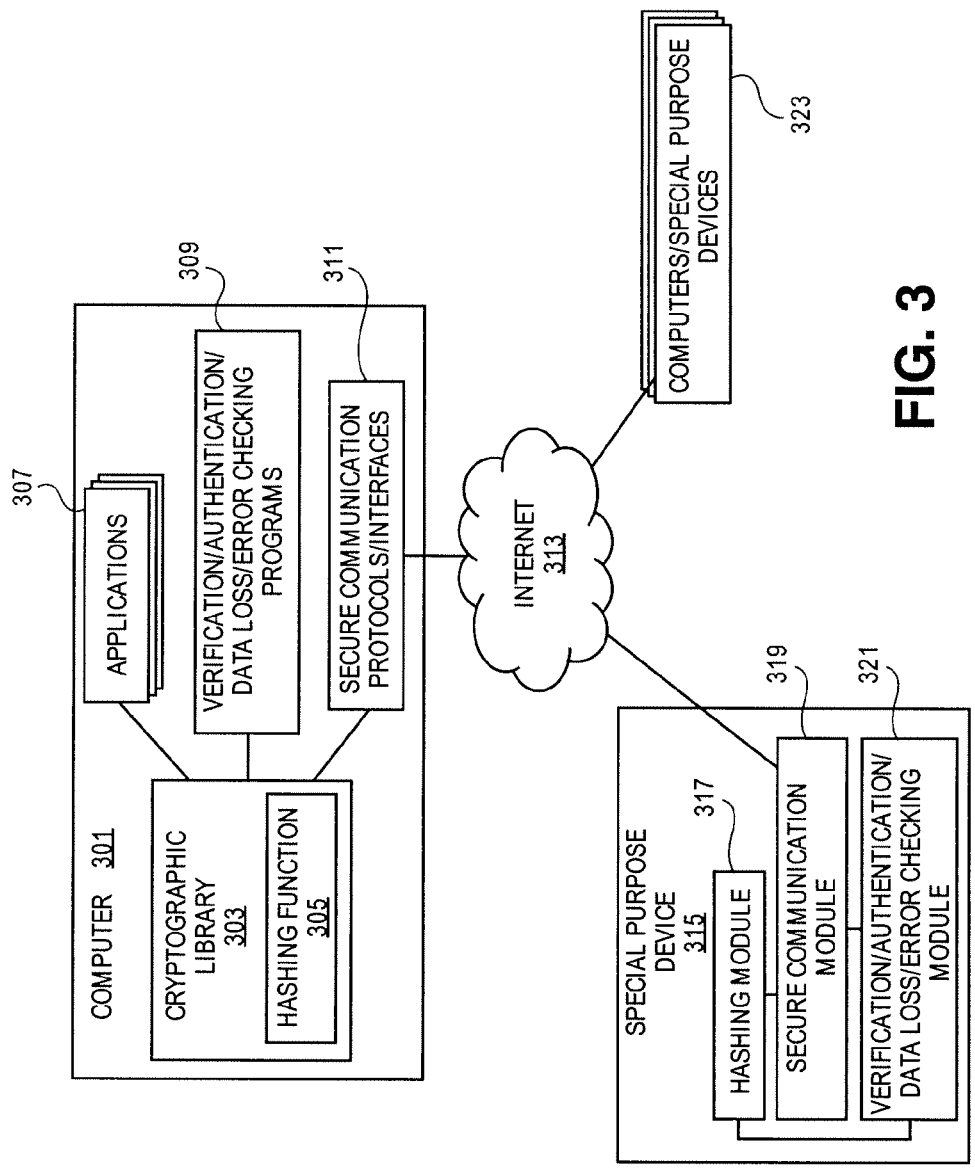
FIG. 3 is a diagram of one embodiment of a system for secure communication, verification, authentication or error checking using an iteratively generated compound hash value.

FIG. 3 is a diagram of one embodiment of a system for secure communication, verification, authentication or error checking using an iteratively generated compound hash value. In one embodiment, the system includes a computer 301, a cryptographic library 303 and a set of programs 307-311 that utilize the cryptographic library 303. The computer 301 can be any type of computing device including a workstation, desktop, laptop, server, networking device, console device or similar computing device. The computing device 301 can be connected with a network 313. The network 313 can be a local area network (LAN), a wide area network (WAN), such as the Internet, or similar network. The network can included wired and wireless devices.

In one embodiment, the cryptographic library 303 provides cryptographic functions and services to the programs 307-311 of the computer 301. The programs 307-311 can include general purposed applications 307, verification, authentication, data loss and error checking 309 programs, secure or unsecured communication protocols and interfaces 311, and similar programs. Any number of programs 307-311 can call the functions of the cryptographic library 303.

The cryptographic library 303 can include any number of cryptographic functions and services. In one embodiment, the cryptographic functions include the iterative compound hash function 305. In this embodiment, the iterative compound hashing function 305 is a software module that can be called by other programs 307, 309, 311 to perform the hashing function described herein for use in their own processes such as part of verification, authentication, data loss detection, error checking and similar applications 309. The iterative compound hashing function 305 can also be called by programs that implement secured or unsecured communication protocols 311.

The iterative compound hash function software module 305 is stored in a persistent storage device of the computer 301. The persistent storage device can be a set of computer-readable storage media in which the iterative compound hash function software module 305 is stored as a set of instructions. The iterative compound hash function software module 305 is executed by a set of processors in the computer 301 when it is called by other applications or similarly utilized. A 'set,' as used herein refers to any positive whole number of items including one item. The structures and features of the computer 301 and iterative compound hashing module 305 are described in further detail below in reference to FIG. 5.

In another embodiment, a hashing module 317 is a hardware component of a special purpose device 315. The special purposed device can be a device such a networking device, telecommunication device (e.g., telephone), music playback device, gaming device or similar device. The special purpose device 315 can include a set of hardware components including the hashing module 315, secure communication module 319, verification, authentication, data loss, or error checking module 321 or similar components. Each of these components can be implemented as a discrete hardware device such as an application specific integrated circuit (ASIC) or similar hardware device.

The computer 301 and special purpose device 315 can be a part of a larger system including the network 313 and any number of additional computers or special purpose devices 323. This system can rely on the known functionality of the hashing function software module 305 and the hardware hashing module 317 to enable interoperability for functions and services like communication protocols, authentication, verification, and data loss detection.

Figure 4:
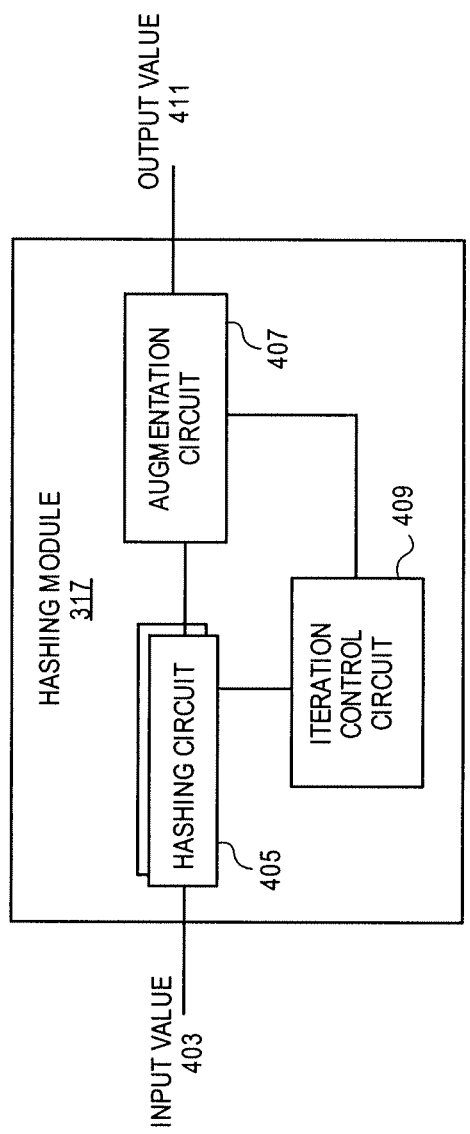
FIG. 4 is a diagram of one embodiment of a hashing module.

FIG. 4 is a diagram of one embodiment of a hashing module. In one example embodiment, the hardware hashing module 317 includes a hashing circuit 405, augmentation circuit 407, iteration control circuit 409 or similar components. These components are provided by way of example, however, one skilled in the art would understand that the structures, features and functionality of these components can be organized into other circuit configurations and combinations consistent with the principles disclosed herein.

A hashing circuit 405 receives at least one input value 403 or signal from an external component. The hashing circuit 405 can also receive additional values or signals that configure the functionality of the hashing circuit 405 such as an input that determines the length of the output value. The hashing circuit 405 or a set of hashing circuits perform each of the hashing operations, linear functions and non-linear functions described in relation to FIG. 1.

An augmentation circuit 407 or set of augmentation circuits perform augmentation operations such as concatenation and similar operations as discussed above in regard to FIG. 1. The augmentation circuit 409 is coupled to the hashing circuit 405 and iteration control circuit 409. In one example embodiment, the augmentation circuit 407 concatenates the left halve and right halve generated by the hashing circuit 405 to generate an output value 411 that is transmitted to an external component. The augmentation circuit 407 can also generate the augmented input value that is used to generate the first right half value.

An iteration control circuit 409 is coupled to the hashing circuit 405 and augmentation circuit 407 to manage data flow between the circuits to implement an iterative process for compounding hashing functions provided by the hashing circuit 405. The iteration control circuit 409 determines the tracks the number of rounds and updates the round counter. The iteration control circuit 409 can also manage the movement of data between the components, storage of data in local working memory or similar locations or similar activities.

Figure 5:
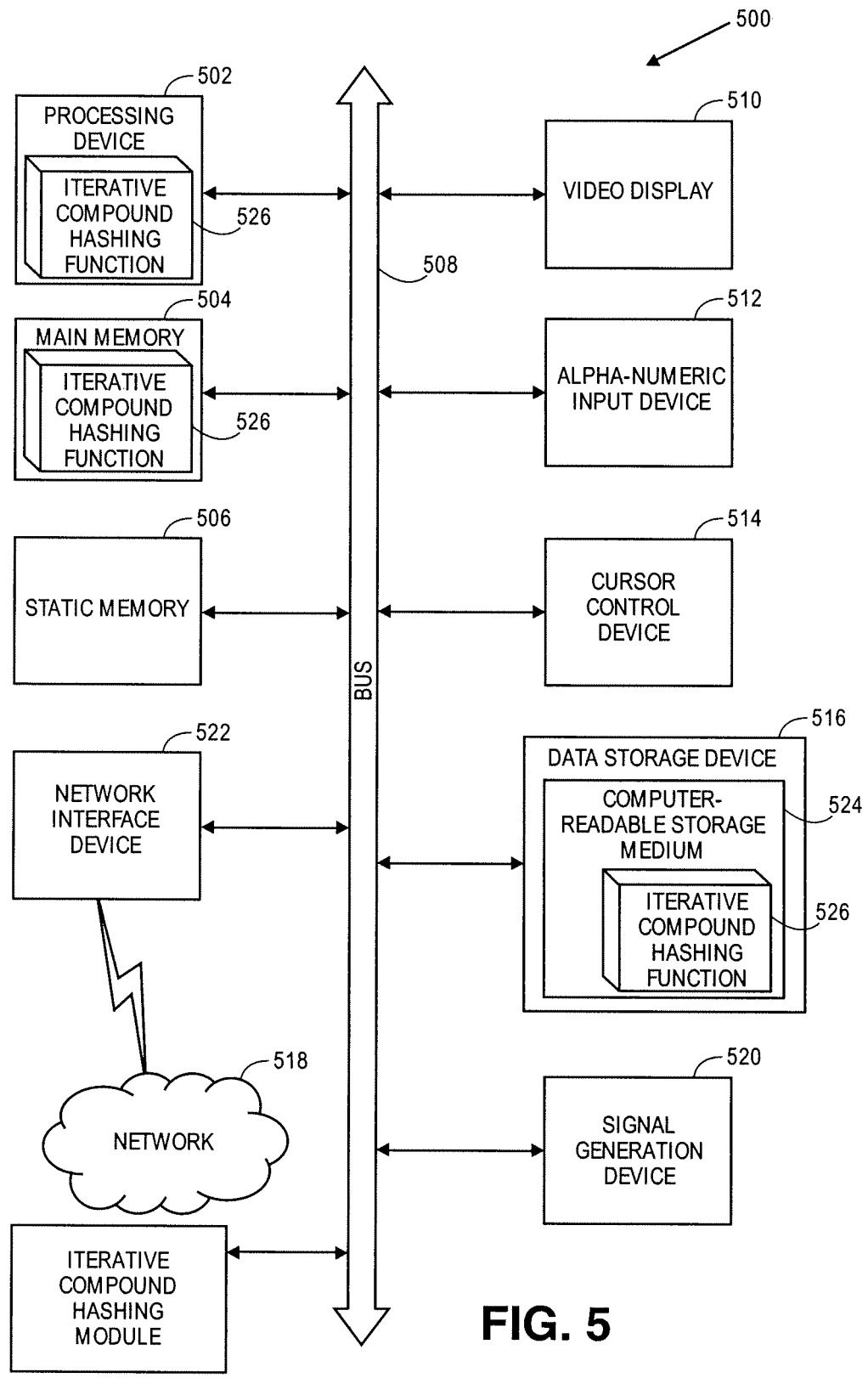
FIG. 5 is a diagram illustrating one embodiment of a system for iteratively generating a compound hash value.

FIG. 5 is a diagram illustrating one embodiment of a system for an iterative compound hashing function. Within the computer system 500 is a set of instructions for causing the computer or other machine to perform any one or more of the methodologies discussed herein. In alternative embodiments, the computer system 500 may be connected (e.g., networked) to other machines in a LAN, an intranet, an extranet, or the Internet. The computer system 500 can operate in the capacity of a server or a client machine (e.g., a client computer executing the secure communication module or a server computer executing a secure communication module) in a client-server network environment, or as a peer machine in a peer-to-peer (or distributed) network environment.

The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computer is illustrated, the term "computer" shall also be taken to include any collection of computer or other machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device in the form of a drive unit, which may include fixed or removable computer-readable medium), which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. In another embodiment, the processing device 502 may also be one or more special-purpose processing devices such as an application specific integrated circuit (ASIC), a field programmable gate array (FPGA), a digital signal processor (DSP), network processor, or the like. The processing device 502 is configured to execute the iterative compound hashing function 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions (e.g., the iterative compound hashing function 526) embodying any one or more of the methodologies or functions described herein. The iterative compound hashing function 526 may also reside, completely or at least partially, within the main memory 504 and/or within the processing device 502 during execution thereof by the computer system 500, the main memory 504 and the processing device 502 also constituting machine-readable storage media. The iterative compound hashing function 526 may further be transmitted or received over a network 518 via the network interface device 522.

The machine-readable storage medium 524 may also be used to store the iterative compound hashing module 526 persistently. While the machine-readable storage medium 526 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "calculating," "augmenting," "receiving," "authenticating," "verifying," "concatenating," "calculating," "inserting" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems has been described in the description above. In addition, the present invention is not described with reference to any particular programming language. It will be appreciated that a variety of programming languages may be used to implement the teachings of the invention as described herein. Further, while software and hardware embodiments have described herein to illustrate the range of possible implementations, those skilled in the art would understand that any combination of these techniques can be utilized, such that the invention would not have an entirely hardware or software implementation, for example, any of the functions or algorithms described herein could be implemented in microcoded hardware components.

Thus, a method and apparatus for iterative compound hashing has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
    calculating, by a processing device, a first value using a first cryptographic hash function on an input value;
    calculating a second value using a second cryptographic hash function on a first derived value derived from the first value;
    calculating a third value using a first non-linear function on the input value and the second value, wherein the second value comprises a hash;

calculating a fourth value using a first function on the third value and the first value; and concatenating a second derived value derived from the fourth value and a third derived value derived from the third value.

2. The computer-implemented method of claim 1, further comprising: augmenting the first value by concatenating the first value with the input value.

3. The computer-implemented method of claim 1, wherein any one of the first cryptographic hash function, the second cryptographic hash function, the first non-linear function and the first function are a keyed hash message authentication code (HMAC).

4. The computer-implemented method of claim 1, further comprising: iteratively recalculating the third value using the first non-linear function on the fourth value and input value.

5. The computer-implemented method of claim 1, further comprising: iteratively recalculating the fourth value using the first function on the third value and the fourth value.

6. The computer-implemented method of claim 1, wherein the first cryptographic hashing function is different than the second cryptographic hashing function.

7. The computer-implemented method of claim 1, wherein the first non-linear function is different than the first function.

8. A non-transitory computer readable storage medium, having instructions stored therein, which when executed, cause a processing device to perform a set of operations comprising:

calculating, by the processing device, a first value using a first cryptographic hash function on an input value;

calculating a second value using a second cryptographic hash function on a first derived value derived from the first value;

calculating a third value using a first non-linear function on the input value and the second value, wherein the second value comprises a hash;

calculating a fourth value using a first function on the third value and the first value; and concatenating a second derived value derived from the fourth value and a third derived value derived from the third value.

9. The non-transitory computer readable storage medium of claim 8, having further instructions therein, which when executed, cause the processing device to perform a further set of operations, further comprising:

augmenting the first value by concatenating the first value with the input value.

10. The non-transitory computer readable storage medium of claim 8, wherein any one of the first cryptographic hash function, the second cryptographic hash function, the first non-linear function and the first function are a keyed hash message authentication code (HMAC).

11. The non-transitory computer readable storage medium of claim 8, having further instructions therein, which when executed, cause the processing device to perform a further set of operations, further comprising:

iteratively recalculating the third value using the first non-linear function on the fourth value and input value.

12. The non-transitory computer readable storage medium of claim 8, having further instructions therein, which when executed, cause the processing device to perform a further set of operations, further comprising:

iteratively recalculating the fourth value using the first function on the third value and the fourth value.

13. The non-transitory computer readable storage medium of claim 8, wherein the first cryptographic hashing function is different than the second cryptographic hashing function.

14. The non-transitory computer readable storage medium of claim 8, wherein the first non-linear function is different than the first function.

15. A computing device comprising:

a processing device, to iteratively calculate hash values having variable lengths using at least one cryptographic hashing function, the processing device comprising:

at least one hashing circuit to perform the at least one cryptographic hashing function, an augmentation circuit coupled to the at least one hashing circuit, the augmentation circuit to concatenate values generated by the hashing circuit, and an iteration control circuit coupled to the at least one hashing circuit and the augmentation circuit, the iteration control circuit to manage iterative application of the at least one hashing circuit and the augmentation circuit to an input value.

16. The computing device of claim 15, further comprising:

a secure communication module, executable by the processing device, to manage communication with a remote computer and to secure messages sent to the remote computer.

17. The computing device of claim 15, further comprising:

a verification module coupled to the processing device and executable by the processing device to obtain a hash value for comparison and verification of a received input.

18. A computing device comprising:

a means for generating a first plurality of hash values using a plurality of cryptographic hashing functions on an input value; and a means for generating a hashing value by iteratively processing each of the first plurality of hash values with non-linear functions, wherein the means for generating the hashing value is configured to generate hashing values having variable lengths.

19. The computing device of claim 18, further comprising:

a means for combining results of iteratively processing each of the first plurality of hash values.

20. The computing device of claim 18, wherein the non-linear functions are keyed hashed message authentication code functions.

* * * * *